Feb. 28, 1950   R. J. STADELMAN   2,499,007
SEAT ATTACHMENT FOR BABY STROLLERS
Filed Jan. 22, 1948
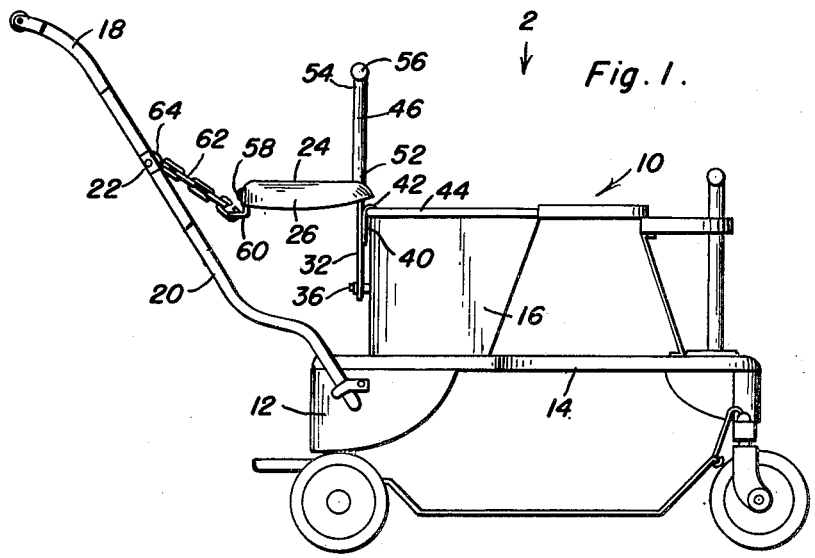
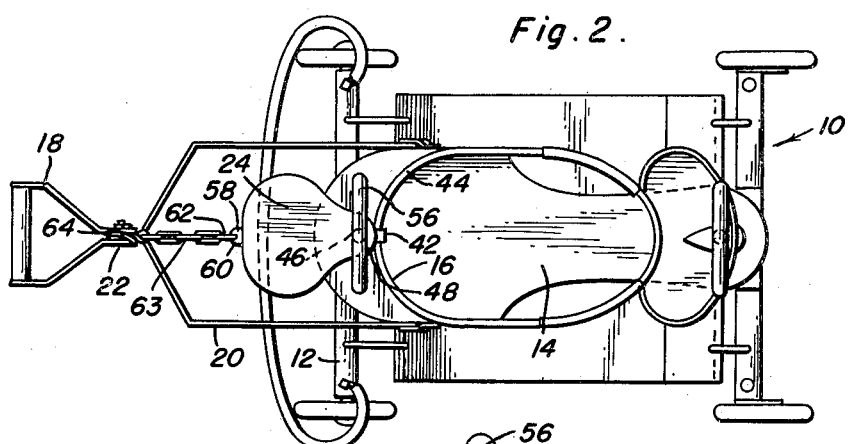
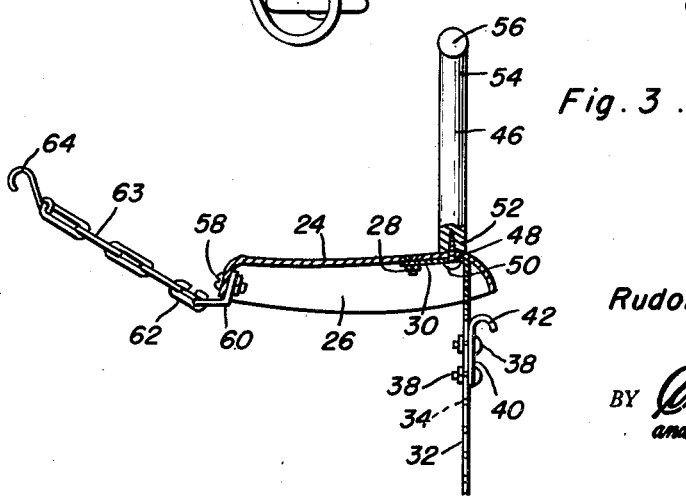
Rudolph J. Stadelman
INVENTOR.

Patented Feb. 28, 1950

2,499,007

UNITED STATES PATENT OFFICE 2,499,007

SEAT ATTACHMENT FOR BABY STROLLERS

Rudolph J. Stadelman, Minneapolis, Minn.

Application January 22, 1948, Serial No. 3,755

4 Claims. (Cl. 155—10)

This invention relates to new and useful improvements in baby strollers and the primary object of the present invention is to provide an auxiliary seat attachment for baby strollers so designed as to facilitate the comfortable positioning of an older child on the same to be wheeled together with a baby seated on the stroller.

Another important object of the present invention is to provide an auxiliary seat for baby strollers including novel and improved means for quickly and readily attaching the same to or removing the same from the stroller in a convenient manner without in any way interfering with the normal structure of the stroller.

A further object of the present invention is to provide a seat attachment for baby strollers that is small and compact in structure and which may be adjusted vertically relative to the backrest of the baby stroller for use by children of various sizes.

A still further aim of the present invention is to provide an auxiliary seat for baby strollers that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a conventional baby stroller and showing the present auxiliary seat applied thereto;

Figure 2 is a top plan view of Figure 1 taken substantially in the direction of arrow numbered 2 in Figure 1; and, Figure 3 is a side elevational view of the present auxiliary seat removed from a baby stroller, and with parts thereof broken away and shown in section.

Referring now to the drawings in detail, wherein for the purpose of illustration, there is disclosed a preferred embodiment of the present invention, the numeral 10 represents a conventional baby stroller generally, comprising a wheeled frame 12, a seat panel 14, an arcuate backrest 16 carried by and extending upwardly from the seat panel 14 and a removable handle structure 18 which includes a pair of side arms 20 which are connected to the handle structure 18 by a bolt or fastener 22. The free ends of the side arms 20 are removably secured to the frame 12 and incline upwardly and rearwardly from the frame 12.

The present invention does not attempt to claim the above conventional structure, but is merely an attachment therefor that will provide an auxiliary seat. The numeral 24 represents a supporting plate or seat in the preferred shape of a usual bicycle seat and which includes a depending flanged portion 26. Removably secured to the inner face of the seat 24, by a fastener or the like 28, is the shorter leg 30 of a substantially L-shaped supporting plate or member 32 which is provided with a plurality of longitudinally spaced openings 34 one of which engages a fastener 36 carried by the backrest 16 for vertical adjustment of the seat 24 relative to the backrest 16.

Adjustably and removably secured to the supporting plate 32, by fasteners or the like 38, is an anchor plate 40 having an arcuate, outwardly extending end portion 42 that frictionally engages an arcuate sleeve 44 at the upper end of the backrest 16, for retaining the supporting plate relative to the said backrest.

An upright or support post 46 is removably secured to the forward rounded end 48 of the seat 24, by a fastener 50 that extends upwardly through the shorter leg 30 of the supporting plate 32 and which bites into the lower end 52 of the support post, to retain the latter in a substantially vertical position. Suitably fixed to the upper end 54 of the support post 46, is a cross bar or handle 56 which may be conveniently gripped by a child positioned on the seat 24.

Removably secured to the flanged portion 26, at the rear portion of the seat 24, by a fastener or the like 58, is an angulated link 60 which removably engages a split connecting link 62 that removably engages a selected link of a link chain 63. The free end of this link chain supports a removable hook element 64 that is adapted to engage the fastener 22, to support the rear portion of the seat 24 and which prevents downward sagging of the seat 24.

Although shown in the drawings, the seat 24 is constructed of a single sheet of material, it is obvious, that the same may be provided with suitable padding, spring means or the like to further aid in the comfort to a child seated thereupon.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a baby stroller including a wheeled frame, a back rest and a handle extending upwardly and rearwardly from the frame, an auxiliary seat, means for attaching said seat to the back rest, hand gripping means carried by said seat, and means for supporting said seat relative to the handle.

2. The combination of claim 1 wherein said means for attaching said seat to the back rest includes a supporting arm adjustably carried by the back rest.

3. The combination of claim 1 wherein said attaching means includes a supporting arm adjustably carried by the back rest and means connecting said supporting arm to the back rest.

4. The combination of claim 3 wherein said means connecting said supporting arm to the back rest includes an arcuate plate frictionally engaging the upper edge of the back rest.

RUDOLPH J. STADELMAN.

REFERENCES CITED

The following references are of record in the file of this patent:

UNITED STATES PATENTS

| Number | Name | Date |
| --- | --- | --- |
| 264,157 | Hepburn | Sept. 12, 1882 |
| 616,697 | Cowels et al. | Dec. 27, 1898 |
| 995,363 | McCool | June 13, 1911 |
| 1,216,730 | Quiggle | Feb. 20, 1917 |
| 1,302,444 | Silverman | Apr. 29, 1919 |